United States Patent

Sørhaug et al.

[11] Patent Number: 6,058,479
[45] Date of Patent: May 2, 2000

[54] REDUNDANT PATH DATA SWITCH AND MEDIA TRANSLATOR

[75] Inventors: Asbjørn Sørhaug, Gronton, Mass.; Aleksandr L. Kupchik, Nashua, N.H.

[73] Assignee: Lancast, Inc., Nashua, N.H.

[21] Appl. No.: 08/841,864

[22] Filed: May 5, 1997

[51] Int. Cl.[7] ................................................ H04L 9/00
[52] U.S. Cl. .................... 713/193; 713/189; 713/200; 713/201; 380/200; 380/201; 380/255; 380/287
[58] Field of Search .................... 370/270, 271, 370/315, 326, 327, 464, 498, 501; 375/211, 214, 288; 380/9, 48, 49, 50, 59, 33, 34, 30, 200–204, 255, 287; 395/200.8; 713/189, 193, 194, 200, 201

[56] References Cited

U.S. PATENT DOCUMENTS

| | | | |
|---|---|---|---|
| 5,119,402 | 6/1992 | Ginzburg et al. | 375/288 |
| 5,161,192 | 11/1992 | Carter et al. | 380/48 |
| 5,386,470 | 1/1995 | Carter et al. | 380/48 |
| 5,406,554 | 4/1995 | Parry . | |
| 5,459,723 | 10/1995 | Thor . | |
| 5,615,340 | 3/1997 | Dai et al. | 395/200.8 |
| 5,642,420 | 6/1997 | Kuroda et al. | 380/30 |

OTHER PUBLICATIONS

ICS Data Book 1996, pp F–47 to F–48 part No. ICS1886 Data Sheet.
ICS Internet Web Page, Feb. 1997, Part No. ICS1885/1886 Applications Note.
Nat. Semi. 1994 Data Book, pp 1–13 to 1–21, Part No. DP83223 Data sheet.

*Primary Examiner*—Bernarr E. Gregory
*Attorney, Agent, or Firm*—Stephen G. Matzuk

[57] ABSTRACT

A bi-directional network medium translator and automatic redundant media data path switch connected between two dissimilar network media, e.g. Fiber Optic (FX) and a plurality of Twisted Pair (TX) data paths, comprising a transceiver and a clock recovery element for each medium, a multiplexer which selectively connects one of said redundant data paths according to a detected master data path failure, and a bi-directional scrambler/descrambler which receives, processes and transmits the data while in the serial data format. Thus, the apparatus according to the present invention is operable to the maximum data rates currently used, provides significantly reduced data delay and reduced lost data due to data path failures and lengthy path switchover times, and may be field-modified to a variety of different media.

14 Claims, 4 Drawing Sheets

REDUNDANT PATH DATA SWITCH AND MEDIA TRANSLATOR

FIELD OF THE INVENTION

The present invention relates to redundant data links, in particular, redundant data links and data switches as may be used in local and wide area networks, redundant computer equipment systems and as data medium translators.

BACKGROUND OF THE INVENTION

Previously, the most widely used approach for transmitting a first format data on a redundant second format was to use a network hub with two links connected to another network hub. However, translation via each data hub port introduces significant data delays, typically in excess of 90 serial data bits, which reduces the network performance and adds to the limitations of the physical size of the network.

Such data delay and other data translation limitations experienced by hub and other prior data translation devices are, in large part, a result of internal transfer data from the incoming media serial format to an internal parallel format for buffering or processing, and back to the serial format for retransmission. The well established building blocks used in many such systems consist of a an integrated circuit, e.g. part #DP83223, which provides the necessary electrical signalling and media state, while a second subsequently connected integrated circuit, e.g. part #DP83240, recovers the clock signal from the incoming signal, decodes or descrambles the NRZ, MLT3 or other cipher format encrypted signal and provides a plaintext data signal in a 4-bit parallel standard. The plaintext parallel data is then received by a buffer or processor provided by a variety of integrated circuits as are known in the art. For hub configurations, similar parallel data paths are provided.

Additional data delays or system complexities arise for system accommodation of data path failure detection and redundant path switchover in the event of master (primary) data path failures. Moreover, in view of the extended delay in data transmissions and path switchover, significant data will be lost before the redundant (secondary or slave) data paths are connected or enabled.

As demonstrated by the widespread adherence to the parallel data format by integrated circuit and equipment designers, the above-discussed limitations imposed on the data flow are generally accepted as unavoidable, and thus the performance of redundant path data translation equipment is marginal.

SUMMARY OF THE INVENTION

The apparatus and method according to the present invention provide a first medium to a redundant second medium, data translator including physical layer devices which provide the necessary media interfacing and clock recovery and a serial stream of encrypted data to a serial data scrambler/descrambler, which provides frame synchronization with a minimal data bit delay, typically 5 bits. A high speed multiplexer selectively provides data from a master (primary) data path, and upon detection of a data path failure by physical layer devices, from a secondary data path to the serial buffer for transmission on the first medium data path. In one embodiment according to the present invention, the scrambler/descrambler comprises a National Semiconductor part no. DP83222 previously intended for serial descrambling prior to data conversion to parallel format and subsequent processing, but adapted according to the present invention to provide the serial bit output prior to retransmission in the alternate medium format; additionally, the scrambler/descrambler provides a relatively small (compared to parallel data systems) amount of serial buffering of the data.

Having recognized the desirability, and providing the apparatus and method to provide redundant data translation while in the serial format according to the present invention, a total translated data delay time of 15 bits or less is achieved. When compared to the typical 4-bit serial-parallel-serial data systems data delay of at least 45 bits, the apparatus of the present invention provides a significant improvement.

Alternate embodiments include data path switching between redundant second medium data paths of the same kind as the first medium and directly providing, via a multiplexer, the data without scrambling or descrambling.

Further embodiments include a data system having redundant data equipment, such as synchronized computers operating identical application programs, connected to the redundant data path data switch according to the present invention.

BRIEF DESCRIPTION OF THE DRAWING

These and further features of the present invention will be better understood by reading the following Detailed Description together with the Drawing, wherein.

DETAILED DESCRIPTION OF THE INVENTION

Figure 1:
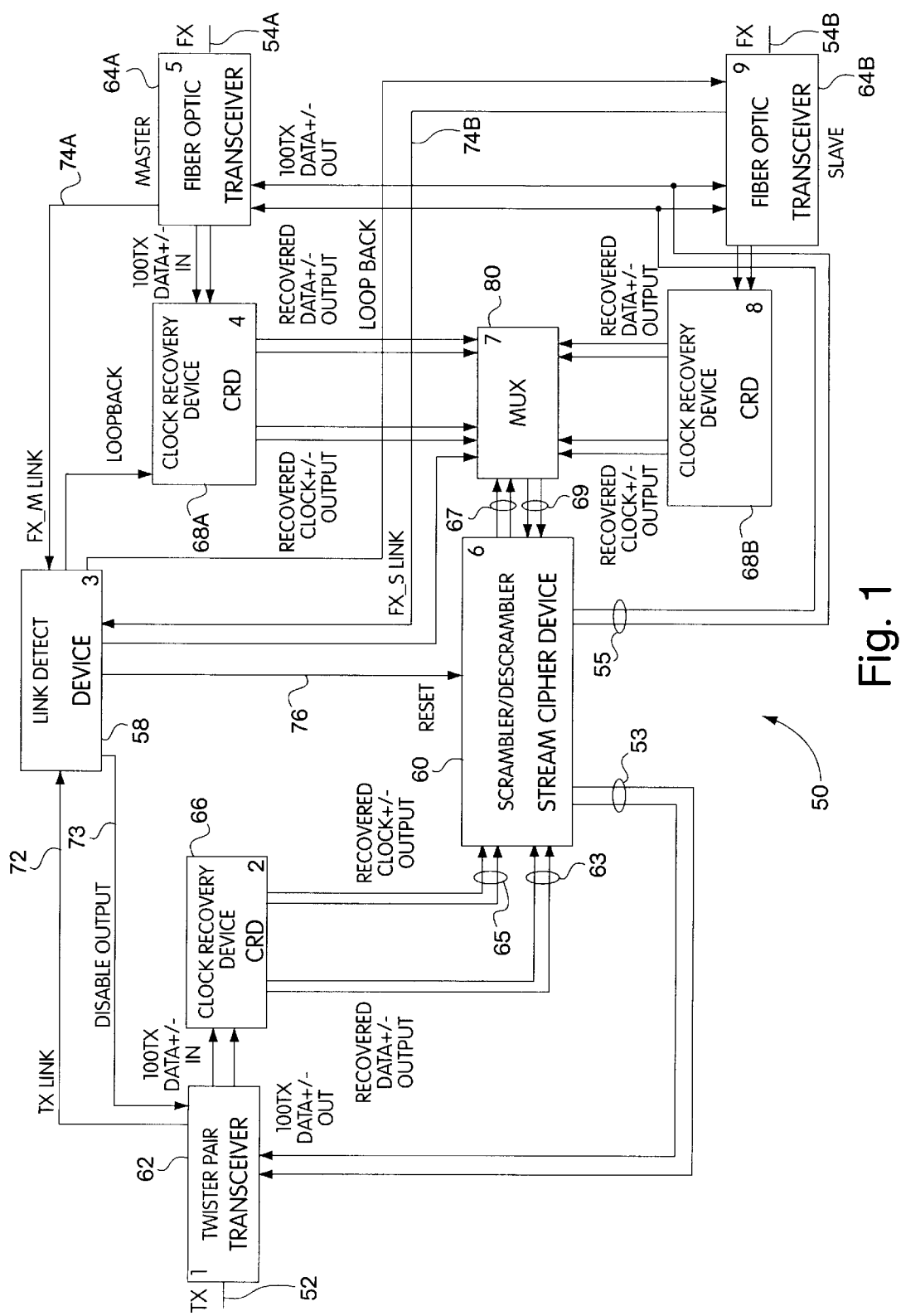
FIG. 1 is a block diagram of one embodiment of the present invention providing translation between a twisted pair and fiber optic medium.

The preferred embodiment 50 of the present invention as shown in FIG. 1, provides data translation from a first medium 52 via a transceiver 62, clock recovery device 66, scrambler/descrambler 60 and second medium transceivers 64A and 64B to the second media 54A and 54B. In the present embodiment, the first exemplary medium is full or half duplex twisted pair compliant with ANSI X3T9.5 TP-PMD and IEEE 802.3 100BASE-TX Ethernet twisted pair specifications; other media are supportable according to the present invention. The second medium complies with the IEEE 802.3 100BASE-FX, FDDI fiber optic specifications; other media is supportable according to the present invention.

Data coming from the second medium to the first is translated according to the present invention via the second medium transceivers 64A and 64B, second medium clock recovery devices 68A and 68B multiplexer (MUX) 80, scrambler/descrambler 60, and to the first medium 52 through the first medium transceiver 62.

The transceivers 62 and 64A and 64B typically comprise integrated circuit systems appropriate for each data medium.

In the present embodiment, twisted pair medium transceiver 62 comprise on of parts no. DP 83223 of National Semiconductor, or equivalent, and the fiber optic transceivers 64A and 64B comprises transceiver part no. HFBR-5103-SC by Hewlett-Packard, or equivalent, connected as known in the art to provide and receive serial electrical signals corresponding to the incoming or outgoing medium data. Typically, such circuit systems 62, 64A and 64B detect medium data signals present and provide a corresponding signal on paths 72, 74A and 74B to a link detect circuit 58. If the incoming medium signal fails or becomes unacceptably diminished in quality, the signal on the corresponding path changes. The link detect circuit 58 then provides a 'lost synchronization' signal on path 76 to reset the scrambler/descrambler 60 to re-initiate buffering and descrambling or scrambling according to the direction of the data interruption and as provided by the particular scrambler/descrambler 60 structure implemented. The transceiver 62 output to clock recovery device 66 is disabled according to a disable output signal 73 provided by the link detect device 58 in response to the detect data signal provided on path 72.

The multiplexer 80 receives each received data and received clock signal from the transceivers 64A and 64B, and presents a received data and received clock selected according to a select signal provided by the link detect device 58. The link detect device 58 enables selection of the recovered clock and recovered data from the master data path transceiver 64A when the transceiver 64A indicates active and valid data on the master path 54A as indicated by a corresponding FX M link signal on path 74. When the master path 54A data is not active or not valid and the corresponding FX S (secondary or slave) link signal indicates valid and active data on the slave path 54B, the link detect device 58 a signal to enable the multiplexer 80 to provide the slave data path recovered clock and recovered data to the buffer 60. Additionally, when the master data path is again active and has valid data thereon as provided by the corresponding signal from the clock recovery device 86A, the link detect device 58 provides a corresponding signal to the multiplexer 80 to connect the master data path.

The scrambler/descrambler 60 comprises a bi-directional descrambler/scrambler which receives, processes, and outputs data in entirely while in the 5-bit format. Although not limited thereto, the scrambler/descrambler of the present invention is economically implemented, in part, with a National Semiconductor part no. DP83222, and/or its equivalents.

Figure 1A:
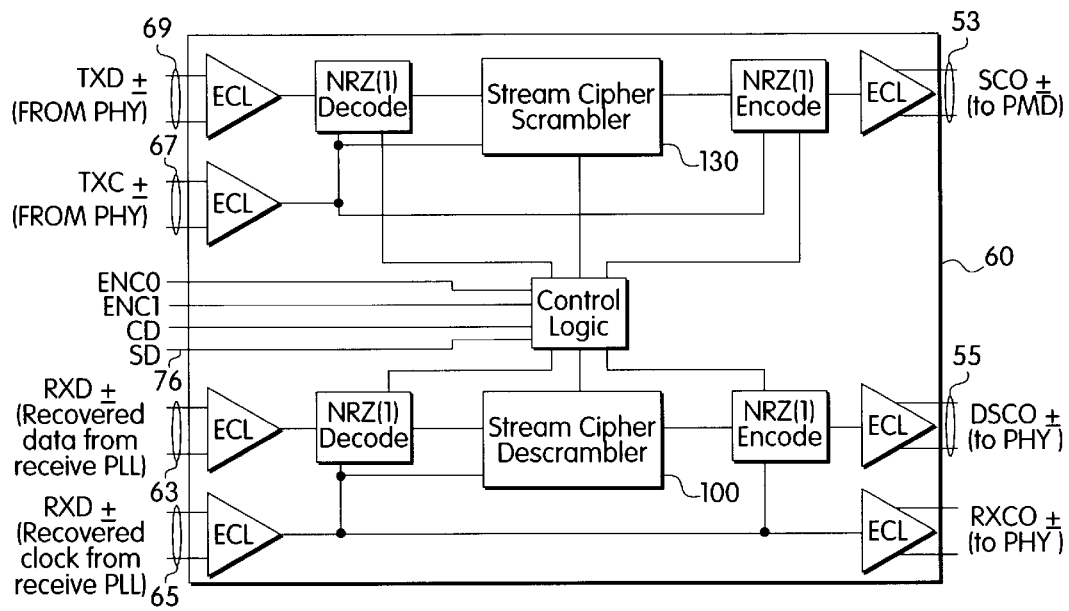
FIG. 1A is a block diagram of the scrambler/descrambler device according to the embodiment of FIG. 1.
Figure 4:
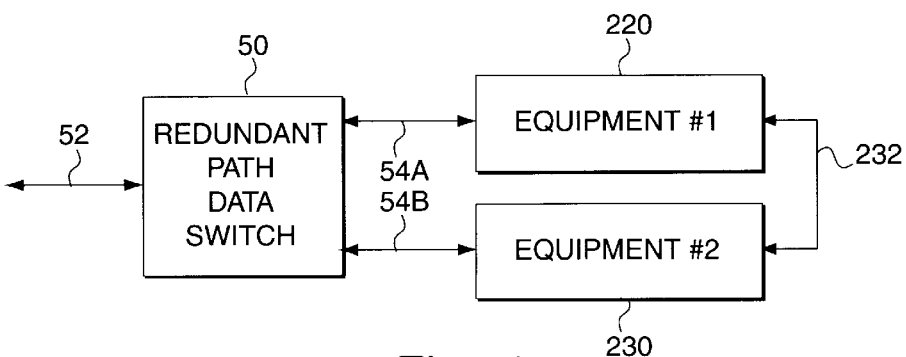
FIG. 4 is a block diagram showing a system according to the present invention having a redundant data path switch and redundant computer system equipment.
Figure 2A:
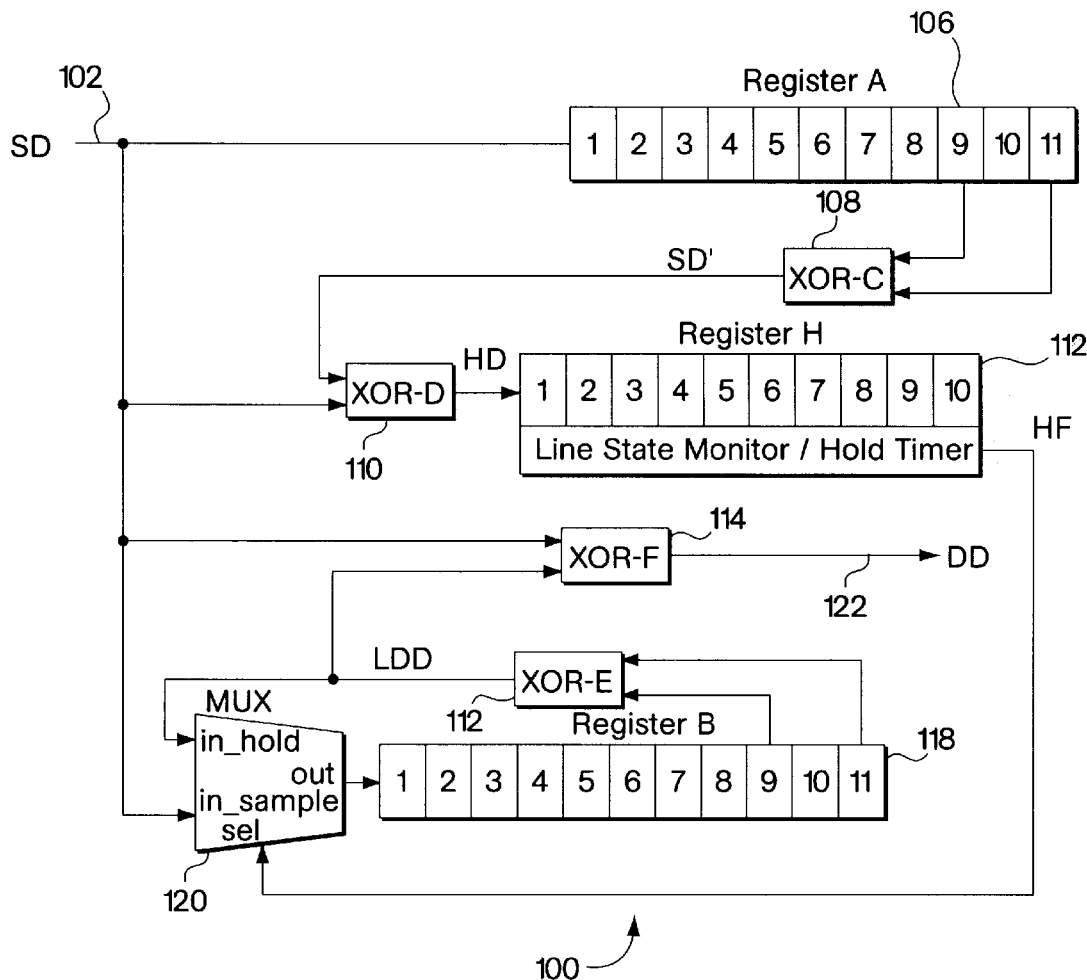
FIG. 2A and FIG. 2B are a block diagrams of the respective descrambler/scrambler structures as provided by an integrated circuit used in the embodiment of FIG. 1.
Figure 2B:
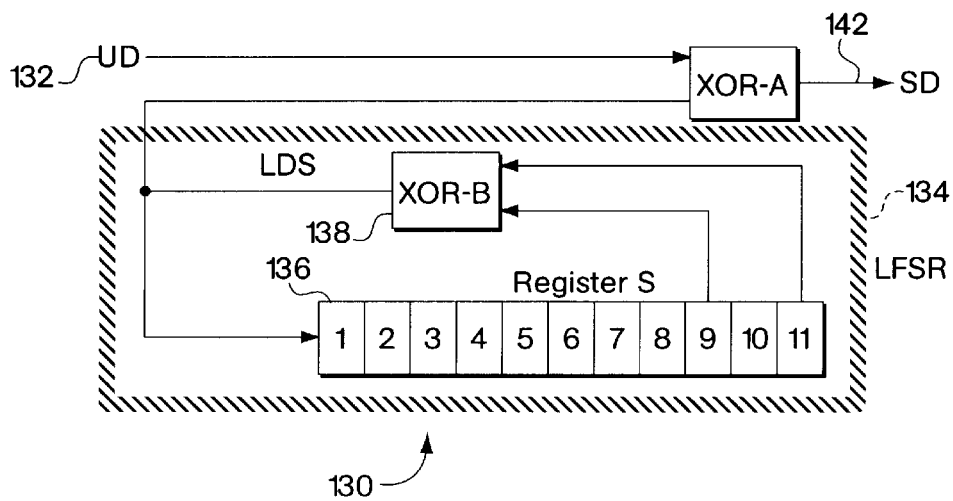

The block diagram of the internal scrambler/descrambler device 60 according to one embodiment of the present invention is shown in FIG. 1A, wherein the stream cipher descrambler 100 provides the NRZ(I) decoded recovered data (received from signal path 63) to the fiber optic transceiver 64 via signal path 55 after being re-encoded (NRZ(I)) at a recovered clock rate provided over signal path 65. Similarly, the stream cipher scrambler 134 provides the NRZ(I) decoded data (received from the signal path 69) to the twisted pair transceiver 62 via signal path 53 as cipher scrambled data after being re-NRZ(I)-encoded.

The descrambler operates in either a sample mode or a hold mode according to the state of the MUX 120 as controlled by the signal provided by a register and line state monitor/hold timer 112 which detects a particular synchronizing data sequence. In the present embodiment, the IDLE line state, characterized by two sequences of 5 binary "1's" will allow data synchronization. However, the descrambler incoming data (at 102) is encrypted and received by tapped shift register 106 having an output via XOR gate 108 to be again combined with the original incoming stream via XOR 110 to provide an output, received by the register monitor/timer 112, which provides the original (unscrambled) IDLE data bit (2 groups of 5 "1" bits). When sufficient (>50, typically) idle "1" bits are received, the MUX 120 recirculates (via XOR 116), and provides an output, which when XOR combined with the incoming data by XOR gate 114, provides the descrambled data output at 122. When a loss of signal is indicated by a signal on 76, the descrambler re-enters sample mode. Other modes of synchronization are within the scope of the present invention as may be incorporated in integrated circuit for the particular medium data synchronization standard. The recovered twisted pair clock signal is received to provide the clock signals to the descrambler registers upon receipt of a particular initial frame signal. Further description of the operation of the particular descrambler (DP 83222) is provide by the 1994 National Semiconductor FDDI Data Book or equivalent, incorporated by reference. The descrambled data (plaintext) output 122 signal is re-NRZ(I) encoded and then received by the fiber optic medium transceiver 64 for transmission thereon at the rate of the data provided by the descrambled data output.

Similarly, the block diagram of the serial register 60 scrambler logic 130 is shown in FIG. 3B, wherein the fiber optic medium 54 data is received at the unscrambled data input 132 from the clock recovery device 68. The fiber optic medium recovered clock signal is received by a clock synchronization circuit 143 to provide the register clock and reset signals to the scrambler register(s) upon receipt of a frame synchronizing symbol on the received fiber optic medium data signal.

In the present embodiment, the fiber optic medium uses an NRZ (or NRZ-type) format which is presented to the input at 132 which is combined at the XOR gate 140 with a bit sequence generated by a linear feedback shift register 134 comprising a shift register 136 and XOR gate 138 connected to recirculate the XOR of bits 9 and 11. The scrambler data output 142 signal is received by the twisted pair transceiver 62 for transmission onto the twisted pair medium 52.

In the present embodiments, the descrambler 100 and scrambler 130 logic is contained within a single integrated circuit and may be independently and simultaneously operated to provide full duplex first-to-second and second-to-first media translation. Other embodiments may provide serial register 60 implementation with discrete logic and/or multiple descrambler/scrambler integrated circuits.

The multiplexer 80 in the exemplary embodiment includes a 2-input ECL data multiplexer generally available in the art having sufficient speed to provide the data throughput. The link detect device 58 includes the necessary transceiver output-to-ECL multiplexer logic level converters as known in the art. The clock recovery device, e.g. 66, typically comprises an ICS, Inc. part no. ICS1886, the manufacturer's specifications and application data being incorporated by reference.

Figure 3:
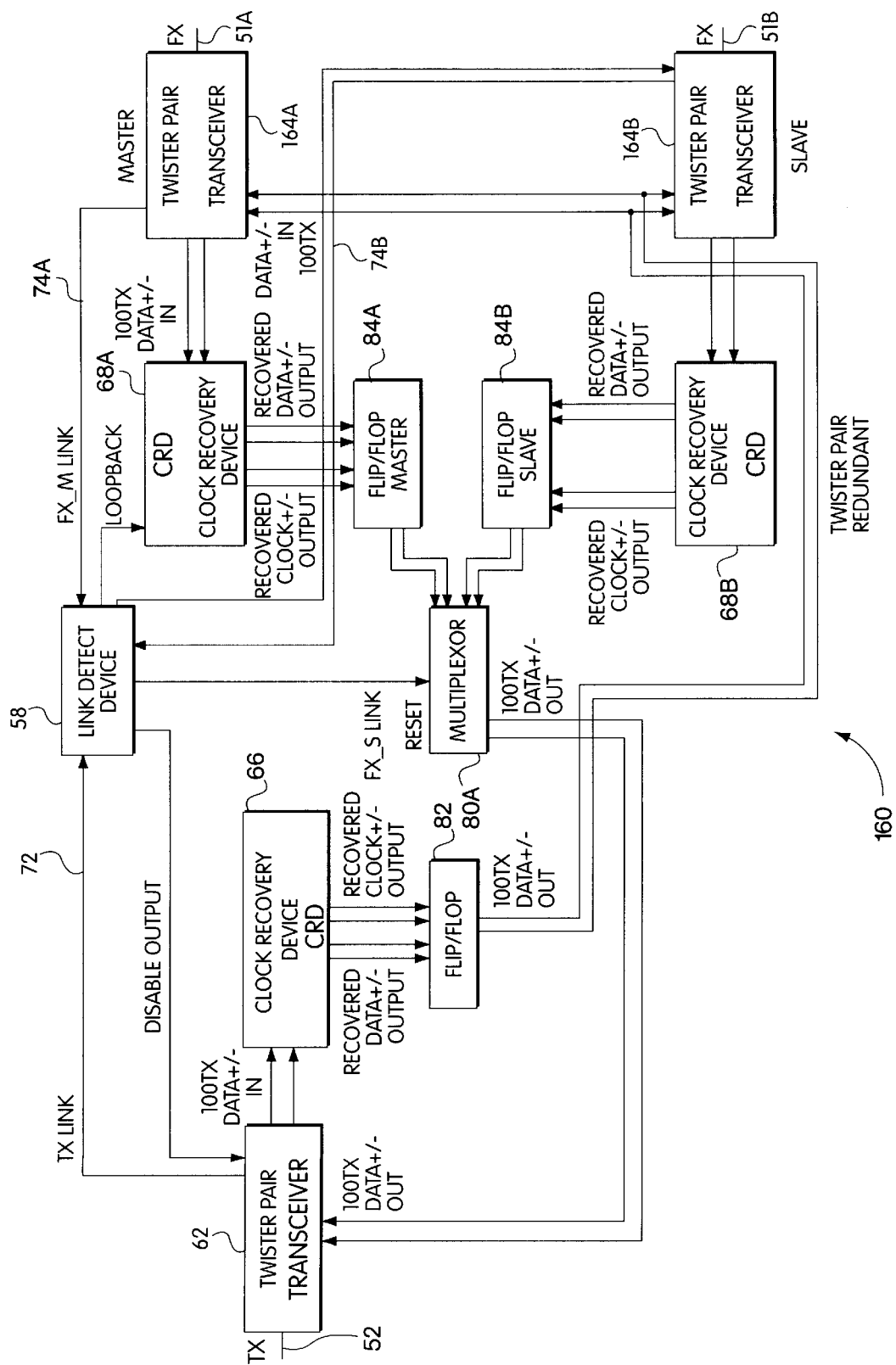
FIG. 3 is a block diagram of an alternate embodiment providing redundant data path switching to another path, all of the same media.

The alternate embodiment 160 of FIG. 3, having the same media connected to all transceivers, provides the signals from the redundant medium transceivers 164A and 164B to transceiver 62 via multiplexer 80A which is otherwise operated as described, above, with respect to multiplexer 80. The data is received by the multiplexer 80A from the transceivers 164A and 164B via clock recovery devices 68A and 68B and corresponding flip-flops 84A and 84B, through which data is toggled by the corresponding recovered clock signals. Similarly, data to be transmitted to the redundant medium is provided directly to the transceivers 164A and 164B via transceiver 62, clock recovery device 66 and flip-flop 82, through which data is toggled by the corresponding recovered clock from the clock recovery device 66.

A further embodiment 200 according to the present invention is provides a redundant equipment system including a redundant path data switch 210 such as exemplified by the embodiments 50 and 160 of FIG. 1 and FIG. 3, respectively, connected to redundant equipment 220 and 230, typically comprising computer systems redundantly operating identical application programs. Moreover, the equipment data transfers and/or program operations are synchronized by an external data path 232 as known in the art.

Embodiments which provide additional slave data paths via corresponding transceivers, clock recovery devices, etc. provide connection to a selected slave path in a predetermined priority. Further modifications and substitutions made by one of ordinary skill in the art are considered within the scope of the present invention which is not to be limited except by the claims which follow.

What is claimed is:

1. Apparatus providing data translation between a first data medium and a plurality of second data media with data scrambling/descrambling therebetween, comprising:

a means for receiving serial data from said first medium and providing an encoded first medium signal;

a first medium clock recovery means connected to said encoded first medium signal and providing a first medium clock signal;

one of a data scrambler and a data descrambler connected to receive said encoded serial data from said means for receiving serial data from a first medium according to said first medium clock signal;

plural means for transmitting serial data from said one of said data scrambler and said data descrambler to each of said second data medium.

2. The apparatus of claim 1, further including:

plural means for receiving serial data from each of said second medium and providing an encoded second medium signal, wherein one of said second media is designated a primary second medium, the remaining being designated secondary second medium;

plural second medium clock recovery means, each being connected to receive one of said encoded second medium signal and each providing a corresponding second medium clock signal;

multiplexer means connected to receive each encoded second medium signal and the corresponding second medium clock signal and selectively connecting said designated primary second medium signal and said corresponding clock signal and switching to a secondary medium signal and corresponding clock signal according to a control signal;

a line signal detect means connected to said primary second media signal for providing said control signal upon the failure of said primary second medium signal;

one of a data scrambler and a data descrambler connected to receive said encoded serial data from said multiplexer means according to said corresponding second medium clock signal;

means for transmitting serial data from said one of said data scrambler and said data descrambler to said first data medium.

3. The apparatus of claim 1, wherein said means for receiving serial data from said first medium and said means for transmitting data to said first medium comprises a first medium data transceiver, and each said means for receiving serial data from said second medium and corresponding said means for transmitting data to said second medium comprises a second medium data transceiver.

4. A bi-directional medium translator, comprising:

a first medium transceiver connected to a first medium for receiving and sending data thereon;

a first clock recovery device connected to said first medium transceiver for providing a recovered first medium clock signal and first medium data;

a plurality of second medium transceivers each connected to a corresponding second medium for receiving and sending data thereon, wherein one of said second media is designated a primary second medium, the remainder being designated secondary second medium;

a data descrambler connected to receive said recovered first medium data and to provide a descrambled output to said second medium transceivers according to said recovered first medium clock signal;

a plurality second clock recovery device each being connected to a corresponding said second medium transceiver for providing a corresponding recovered second medium clock signal and second medium data; and means for detecting a failure of said primary medium data and thereupon providing a control signal;

means for selectively providing said primary second medium data and clock signal and for providing a secondary second medium data and clock signal in response to said control signal;

a data scrambler connected to said means for selectively providing to receive said recovered second medium data and to provide a scrambled output to said first medium transceiver at selected said recovered second medium clock signal.

5. The bi-directional medium translator of claim 4, wherein at least one of said data scrambler and said descrambler includes means for decoding one of an NRZ and an NRZI signal and means for encoding one of an NRZ and an NRZI signal.

6. The bi-directional medium translator of claim 4, wherein said means for selectively providing comprises a multiplexer.

7. The bi-directional medium translator of claim 4, wherein said means for detecting a failure comprises said clock recovery device.

8. The bi-directional medium translator of claim 4, wherein said first and said second medium are different.

9. The bi-directional medium translator of claim 8, wherein said first medium comprises one of twisted pair and fiber optic media, and second medium comprises the other of said twisted pair and fiber optic medium.

10. An automatically switched redundant data system, comprising:

a first transceiver for providing a received data and recovered clock signal and for transmitting a data signal to a first medium;

a plurality of second transceivers for providing a received data and recovered clock signal and for transmitting a data signal to a corresponding second medium;

means for providing said first medium received data to said plurality of second transceivers; and means for providing to said first transceiver, received data from a selected one of said plurality of second transceivers in a selected priority sequence.

11. The system of claim 10, wherein one of said second media is defined as a primary second medium, the remainder being secondary second media, and said means for sequentially providing provides connection to said primary second medium, and upon failure of data reception on said primary second medium, connection to said secondary second medium.

12. The system of claim 10, further comprising:

a first equipment connected to said first medium;

a second equipment connected to said second medium; and means for synchronizing said first and second equipment.

13. The system of claim 12, wherein said first and second equipment comprises computer systems having substantially identical applications programs in synchronized operation.

14. Data translator apparatus comprising:

a first media transceiver connected to a first medium;

a first media clock recovery device connected to receive data from said first medium transceiver and providing a recovered first medium data and clock signal;

a first data buffer connected to receive said recovered first medium data and clock signal;

a second data buffer connected to provide data to said first medium transceiver;

a plurality of second medium transceivers, each being connected to a corresponding data path;

a plurality of clock recovery devices connected to receive data from one of said second medium transceivers and providing a corresponding second medium data and recovered clock signals and receiving data from said first data buffer;

multiplexer means for receiving each of said second medium recovered data and clock signals and according to a control signals, for selectively providing a selected one of said second medium recovered data and clock signals to said second data buffer;

means for detecting second medium path failures providing a corresponding detected path failure signal; and means for providing said control signal for selectively providing, via said multiplexer, signals to said first media transceiver as a priority path signal, and upon receipt of a detected path failure signal providing a selected secondary second medium data and clock signal to said second buffer.

* * * * *